Sept. 7, 1965   W. J. BLAISDELL   3,204,332
METHOD OF MAKING CONDUITS
Original Filed Oct. 1, 1957

INVENTOR.
WILLIAM J. BLAISDELL
BY Bauer and Seymour
ATTORNEYS

United States Patent Office 3,204,332
Patented Sept. 7, 1965

3,204,332
METHOD OF MAKING CONDUITS
William J. Blaisdell, Sidney, N.Y., assignor to The Bendix Corporation, Sidney, N.Y., a corporation of Delaware
Continuation of application Ser. No. 687,419, Oct. 1, 1957. This application Jan. 31, 1962, Ser. No. 172,370
10 Claims. (Cl. 29—471.7)

This application is a continuation of application Serial No. 687,419, filed Oct. 1, 1957, now abandoned.

This invention relates to a method of making a joint for a conduit such as a conduit for shielding electrical conductors.

The invention has for one of its objects the provision of an improved method of making a joint for a flexible metal conduit.

Another object lies in the provision of a method of making a conduit joint which is strong, which is serviceable at high temperatures, and which prevents undue bending of the flexible conduit adjacent the joint.

Another object lies in the provision of an improved method of making a joint for flexible metal conduits having braided outer sheaths, the joint providing protection for the ends of the wires in the braided sheath adjacent the joint.

Still a further object is to provide a novel method of making a conduit joint by steps including welding, the method eliminating the necessity of soldering fluxes, and localizing the welding heat whereby to prevent damage to the conduit and to the fitting connected thereto at the joint.

Yet another object lies in the provision of a method of making a joint for a flexible metal conduit which utilizes relatively inexpensive fittings and minimizes conduit preparation prior to the bonding of the fitting thereto.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in side elevation of a length of flexible metal conduit connected to terminal fittings by joints made in accordance with the invention, an intermediate section of the conduit being shown broken away, the terminal fitting at the left being shown partially in vertical axial section and in the process of being joined to the conduit;

Figure 1:
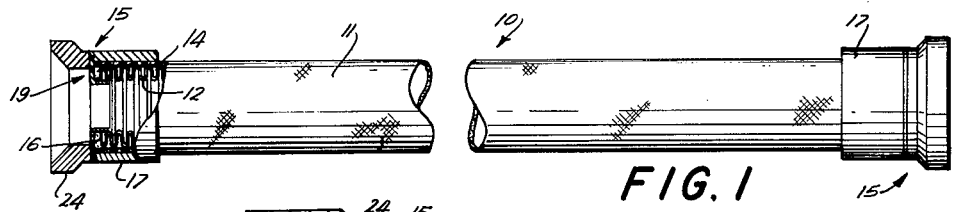

In the drawings there is shown a flexible conduit member 10 which includes a section of flexible conduit 11 having terminal fittings 15 connected thereto at each end. The conduit element 10, in this instance, is particularly adapted for the radio shielding of electrical conductors (not shown) which are to be housed within the conduit member. It will be understood, however, that the conduit member may be employed to advantage for other purposes, such as the conducting of liquids or gases. In the illustrative embodiment, conduit 11 has an impervious inner member which extends throughout the length of the conduit, such inner member being in the form of a transversely corrugated metal tube 12 which in the particular conduit to be discussed is made of stainless steel. Overlying corrugated tube 12 is an outer sheath 14 made of braided nickel or stainless steel wires. The joint, and the method of making the same, of the present invention allow the inner tube 12 and the outer sheath 14 to be conveniently and economically sealed and bonded to a terminal fitting.

Figure 2:
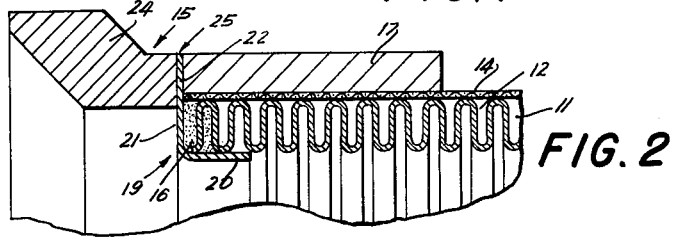
FIG. 2 is an enlarged fragmentary view of the terminal fitting at the left in FIG. 1 and the portion of the conduit cooperating therewith.
Figure 3:
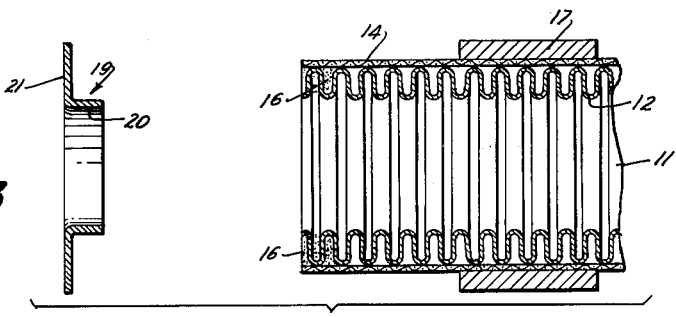
FIG. 3 is an exploded view in axial section showing the end of a conduit and joint-forming parts which cooperate therewith.

In making the conduit member 10 shown, the required length of conduit 11 is cut, the ends of the conduit being ground or sanded so that they are smooth and lie in a plane at right angles to the longitudinal axis of the conduit. The cuts are preferably so located that the convolution at the end of tube 12 is axially open, thereby allowing access thereto without necessitating the opening up of the end of sheath 14. Preferably before such cut is made two outer sleeve members 17 will have been telescoped over a stock length of the tube and slid to positions inwardly of the cuts to be made. The sleeves 17 fit relatively closely over the conduit 11, and are of a length somewhat greater than the inner sleeve 20. If necessary, the cut ends of the conduit are cleaned and freed from dirt, grease, oils and other foreign materials. A brazing material 16 is now placed at each cut end of the conduit 11 in the manner shown in FIGS. 2, 3, and 4, that is, in the recess formed at the outer end of corrugated tube 12 and in the first, radially inwardly facing recess formed by the first complete corrugation in the tube wall. The brazing material is preferably in the form of a comminuted brazing metal mixed with a paste-like vehicle or adhesive. For the brazing of nickel and stainless steel a suitable brazing material 16 consists of a comminuted nickel base alloy such as that designated AMS4778 mixed with a vehicle consisting of Acryloid resin (Rohm & Haas) B–72 and toluene in the proportion of 1 to 7. It is to be understood that such materials are merely illustrative since other brazing materials and other vehicles such as a mixture of glycerine and alcohol may be employed.

Figure 4:
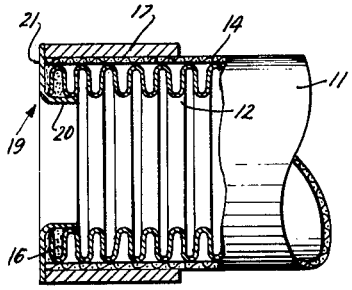
FIG. 4 is a view partially in side elevation and partially in vertical axial section through the parts shown in FIG. 3, after their assembly.

After the brazing material 16 has been thus deposited at the end of conduit 11, a diaphragm generally designated 19 is assembled on such end in the manner shown in FIG. 4. When parts 12 and 14 of the conduit are made of stainless steel and nickel, respectively, as recited, it is preferred that diaphragm 19 be made of stainless steel. The diaphragm has an axially extending sleeve portion 20 which snugly fits within corrugated tube 12 and is of such axial length as at least to close the first radially inwardly open corrugation in tube 12 in which the brazing compound has been placed. Diaphragm 19 has a radially outwardly extending flange 21 which overlies the end of tube 12 and preferably extends outwardly beyond sheath 14 so that its periphery lies flush with the outer surface of sleeve 17. Sleeve 17 is made of a suitable metal such as stainless steel.

The inner tube 12, and the diaphragm 19 are now bonded together by subjecting the end of the conduit to sufficient heat to melt the brazing compound and to secure a good joint between the parts. A convenient method of heating is to employ a shielded arc heating device, such as that known as "Heliarc," the heat from such heating device being conveniently directed against the inner edge of flange 21 while the conduit is rotated relative to the source of heat. During such bonding operation the outer sleeve 17 may or may not, as desired, be placed in its final assembled position.

To make the assembly shown in FIG. 1, the terminal fitting 15, which includes an annular body 24, made of a metal such as stainless steel, is now placed coaxial of the conduit 11 and sleeve 17 with the annular rear surface 22 of body 24 snugly in contact with the forward surface of flange 21 of the diaphragm and with sleeve 17 abutting flange 21 of the diaphragm. The thus assembled parts are held in such relationship by a suitable jig (not shown) and while thus held are welded together by the application of heat applied around the fitting at the zone designated 25. Preferably such heating is effected by a shielded electric arc; no additional metal need be applied to the joint. Electric arc welding of the type known as "Heliarc" welding may be employed for this purpose. Such heating fuses the metal of body 24, the outer edge of flange 21, and sleeve 17 together at their peripheries, and sheath 14, thereby completely sealing the fitting to the diaphragm and sleeve 17.

As a result of the welding operation the terminal fitting forms a gas-tight enclosure with the conduit. Not only does the brazing compound 16 produce a strong gas-tight bond between the parts in a simple economical manner, but its presence at the outer end of the tube 12 prevents such tube from becoming locally overheated and thus damaged, as by intergranular corrosion and/or incipient melting, by the intense heat of the "Heliarc" welding operation. Sleeve 17 increases the joint durability by relieving bending stresses in the conduit which might otherwise be imposed thereon in the immediate joint area.

Figure 5:
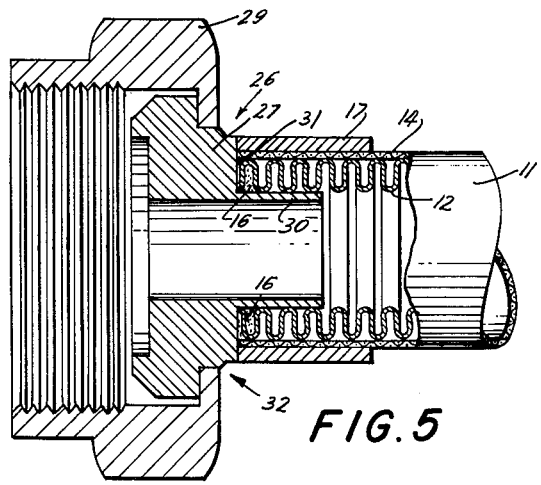
FIG. 5 is a fragmentary view partially in elevation and partially in vertical axial section through an end of a conduit having a second embodiment of terminal fitting connected thereto in accordance with the invention.

In FIG. 5 there is shown a second embodiment of terminal fitting connected and sealed to an end of a flexible conduit 11. The construction of the terminal fitting in FIG. 5 is such as to eliminate the necessity for a separate diaphragm member, thereby decreasing the number of necessary parts and also facilitating the assembly of the fitting on the end of the conduit.

The terminal fitting 26 shown in FIG. 5 has a body 27 adapted to be fixedly connected to the conduit, and an outer internally threaded nut member 29 which is rotatably mounted on body 27 and is adapted to connect the latter to a mating terminal fitting, not shown. Body 27 has an axially directed sleeve portion 30 integral therewith. Sleeve 30 is of such outer diameter as to fit snugly within the end of inner tube 12. The joint includes an outer sleeve 17 which, after brazing compound 16 has been applied to the end of the conduit in the manner above described and the thus treated end of the conduit has been telescoped over sleeve 30, is slid to the left to abut the annular surface 31 of body 27. It will be seen that the sleeve portion 30 and the shoulder 31 of the embodiment of FIG. 5 function in the same manner as the sleeve portion 20 and the flange portion 21 of element 19 of the first described embodiment. The thus assembled parts are held in a suitable jig and are then subjected to heat along the annular zone 32, as by "Heliarc" welding, to bond sleeve 17 to body 27. The heat from such welding operation flows inwardly to melt brazing compound 16 and to bond the end of tube 12 to the sleeve 30 and the braided sheath 14. The resulting joint is strong, rigid and gas-tight.

Although only a limited number of embodiments of the invention have been illustrated in the accompanying drawings and described in the foregoing specification, it is to be expressly understood that various changes, such as in the relative dimensions of the parts, materials used, and the like as well as the suggested manner of use of the apparatus of the invention, may be made therein without departing from the spirit and scope of the invention as will now be apparent to those skilled in the art.

What is claimed is:

1. The method of making a conduit which comprises a transversely corrugated thin-walled flexible metal tube and an annular metal fitting means permanently secured and sealed coaxially of the tube at one end thereof, which includes the steps of placing comminuted brazing metal within at least the first axially closed annular space formed by the corrugations of the tube wall, telescoping an inner metal sleeve member provided with a radially extending annular shoulder within said end of the tube so that the sleeve portion thereof will close off said annular space filled with said brazing metal and so that the annular shoulder will abut and project radially outwardly of the end of the tube, placing a metal outer sleeve over the end portion of said tube, and applying heat to heat the brazing metal to a fusing temperature to braze the tube to the inner sleeve member and at the adjacent edges of said shoulder and the outer sleeve to weld such edges together.

2. A method as defined in claim 1 wherein the application of heat is by means of an electric arc at the adjacent edges of said shoulder and outer sleeve and at the juncture between said shoulder and sleeve portion of the inner sleeve member.

3. The method of making a conduit member which comprises a transversely corrugated thin flexible metal tube and an annular metal fitting permanently secured and sealed coaxially of the tube at one end thereof, comprising the following steps, placing comminuted brazing metal within at least the first axially closed annual space formed by the corrugations of the tube walls, telescoping a flanged sleeve member separate from the fitting within said end of the tube so that the sleeve portion thereof will close off said annular space filled with said brazing metal and so that the flange portion will abut and project radially outwardly of the end of the tube, applying brazing metal fusing heat to the flanged sleeve member to bond the tube to the flanged sleeve member, placing an outer sleeve over said tube end at the brazed joint between the tube and the sleeve, positioning the fitting close to and coaxial of the thus assembled tube, flanged sleeve member, and outer sleeve with said flange portion between and abutting the fitting and the outer sleeve, and after such positioning step applying heat to the confronting edges of the fitting and the outer sleeve to fuse such edges whereby the fitting is welded to said flanged sleeve members and said outer sleeve as an integral unit.

4. The method as defined in claim 3 wherein the diameter of the flange on the flanged sleeve member approximates the diameter of the outer sleeve, the flange is formed of thin stock, and wherein in said second-named heating step the outer edge of such flange is fused along with the confronting edges of the fitting and of the outer sleeve whereby to weld together the fitting, the flange of the flanged sleeve member, and the outer sleeve.

5. The method of making a conduit member which comprises a transversely corrugated thin flexible metal tube and a relatively thick-walled annular metal fitting permanently secured and sealed coaxially of the tube at one end thereof, comprising the following steps, placing a comminuted brazing metal within at least the first axially closed annular space formed by the corrugations of the tube walls, telescoping a thin-walled flanged metal sleeve member separate from the fitting within said end of the tube so that the sleeve portion thereof will close off said annular space filled with said brazing metal and so that the flange portion will abut and project radially outwardly of the end of the tube, applying brazing metal fusing heat to the flanged sleeve member to braze the tube to the flanged sleeve member, placing an outer metal sleeve over said tube end at the brazed joint between the tube and said sleeve portion, positioning the fitting close to and coaxial of the thus assembled tube, flanged sleeve member and outer sleeve with said flange portion between and abutting the fitting and the outer sleeve, the flanged sleeve member, outer sleeve and fitting having elevated melting points of generally the same order, and after such positioning step applying heat to the confronting edges of the fitting and the outer sleeve to fuse such edges whereby the fitting is secured to said flanged sleeve member and said outer sleeve as an integral unit.

6. The method as defined in claim 5 wherein the diameter of the flange on the flanged sleeve member approximates the diameter of the outer sleeve, and wherein in said second-named heating step the outer edge of such flange is fused along with the confronting edges of the fitting and of the outer sleeve whereby to weld together the fitting, the flange of the flanged sleeve member and the outer sleeve.

7. The method of making a conduit member which comprises a thin-walled corrugated metal tube and an annular metal member permanently secured and sealed to an end of the tube by a fused metal joint, which includes the steps of placing comminuted brazing metal on the end of and within at least one corrugation at said end of the tube, telescoping the inner end of a thin-walled sleeve having a radially outwardly extending flange on its outer end within the said end of the tube so that said flange abuts the said end of the tube, applying heat to the exposed surface of the sleeve at the inner periphery of said flange to fuse the brazing metal and to bond the sleeve to the tube, placing a second, outer sleeve closely fitting the tube over the tube at the said end thereof so that surfaces of the second sleeve and of the flange of the first-named sleeve confront and lie close to each other, and welding the second sleeve and the flange of the first-named sleeve together by an annular weld at said confronting surfaces thereof.

8. The method of terminating a conduit comprising a thin-walled corrugated metal tube, which includes the steps of placing a spreadable mixture of powdered metal brazing alloy and a vehicle on the end of said tube and within the axially closed annular space formed inside the tube by a corrugation in the wall thereof near said end, telescoping said end of the tube over a close fitting tubular sleeve portion of a thin-walled metal end member and into end engagement with an annular radial flange portion of said end member and placing a metal sleeve member around the end portion of the tube with an end of the sleeve member adjacent said flange portion to substantially confine said grazing mixture, and applying heat to the outer surfaces of said members to weld said members together and to fuse said mixture for brazing said tube to said end member.

9. The method of terminating a conduit comprising a thin-walled corrugated metal tube closely surrounded by a braided metal tube, which includes the steps of placing a workable mixture of powdered metallic brazing alloy and a vehicle on the end of said conduit and within the axially closed annular space formed inside the corrugated tube by a corrugation in the wall thereof near said end, telescoping said end of the conduit over a close fitting tubular sleeve portion of a thin-walled metal end member and into engagement with an annular radial flange portion of said member and placing a close fitting metal sleeve member around the end portion of the conduit with an end of said sleeve member adjacent said flange portion to substantially confine said mixture on the end portion of the conduit, and applying heat to the outer surfaces of said members to weld said members together and to fuse said mixture for brazing the end portions of said tubes together and to said members.

10. The method of terminating an impervious conduit comprising a thin-walled corrugated metal tube closely surrounded by a braided metal tube, which includes the steps of placing a workable mixture of powdered metallic brazing alloy and a vehicle on the end of said conduit and within the axially closed annular space formed inside the corrugated tube by a corrugation in the wall thereof near said end, telescoping said end of the conduit over a close fitting tubular sleeve portion of a thin-walled metal end member and into engagement with an annular radial flange portion of said member and placing a close fitting metal sleeve member around the end portion of the conduit with an end of said sleeve member adjacent said flange portion to substantially confine said mixture on the end portion of the conduit, and applying heat with an electric arc to the outer surfaces of said members to weld said members together and to fuse said mixture for brazing the end portions of said tubes together and to said members for forming an impervious annular brazed joint between said corrugated tube and said end member.

References Cited by the Examiner

UNITED STATES PATENTS

| | | | |
|---|---|---|---|
| 1,293,977 | 2/19 | Taylor | 28—497 |
| 2,399,103 | 4/46 | Clinedinst | 285—287 |
| 2,480,598 | 8/49 | Ost | 29—497 |
| 2,678,836 | 5/54 | Courtot | 285—149 |
| 2,684,043 | 7/54 | Hughes | 285—286 X |
| 2,987,329 | 6/61 | Barton | 285—149 |
| 3,008,737 | 11/61 | Longfellow | 285—149 |

WHITMORE A. WILTZ, *Primary Examiner.*

CARL W. TOMLIN, *Examiner.*